H. D. CHURCH.
MOTOR VEHICLE.
APPLICATION FILED NOV. 13, 1913.
1,275,133.
Patented Aug. 6, 1918.
2 SHEETS—SHEET 1.
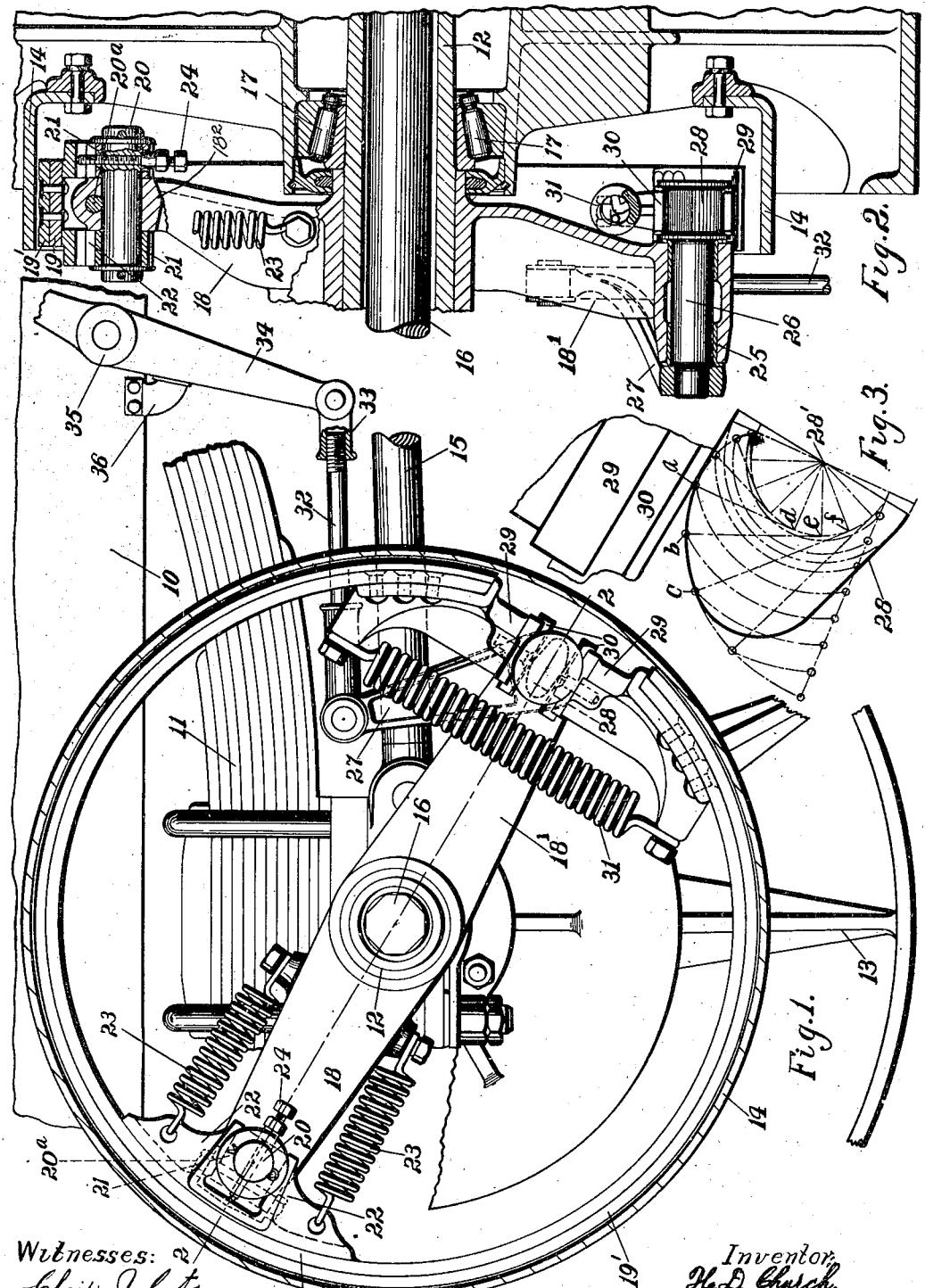

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,275,133.      Specification of Letters Patent.      Patented Aug. 6, 1918.

Application filed November 13, 1913. Serial No. 800,803.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the brake mechanism of such vehicles.

The salient object of the present invention is to produce a braking mechanism for motor vehicles in which a given movement of the brake lever will cause a certain extent of movement of the brake shoe toward the brake drum and a further movement of said lever through the same number of degrees will cause a further movement of the brake shoe to an equal extent.

In carrying out the above object a uniform motion cam is employed for the purpose of expanding the brake shoe against the surface of the brake drum. By the use of such a cam, the brakes may be adjusted for wear without altering in any way the leverage between the brake operating lever and the brake shoe. In other words, when the brakes are newly lined there will be a certain leverage between the brake operating lever and the brake shoe and after the lining has worn to a certain extent, the ends of the brake shoe may be further separated for the purpose of bringing them in contact with the brake drum, and the leverage during this further separation will be exactly or approximately the same as when the brake lining was new.

Another object of the invention is to produce a motor vehicle braking mechanism of simple and efficient construction, and of few and lasting parts.

Other objects than those specified above will be apparent from the following description taken in connection with the drawings which form a part of this specification, and in which:

Figure 1 is a section through the brake drum of the right wheel of a motor vehicle showing the brake shoes and some parts of the vehicle in elevation;

Fig. 2 is a section approximately on the line 2—2 of Fig. 1;

Fig. 3 is a diagrammatic view on an enlarged scale showing one half of the uniform motion cam for operating the brake;

Figure 4:
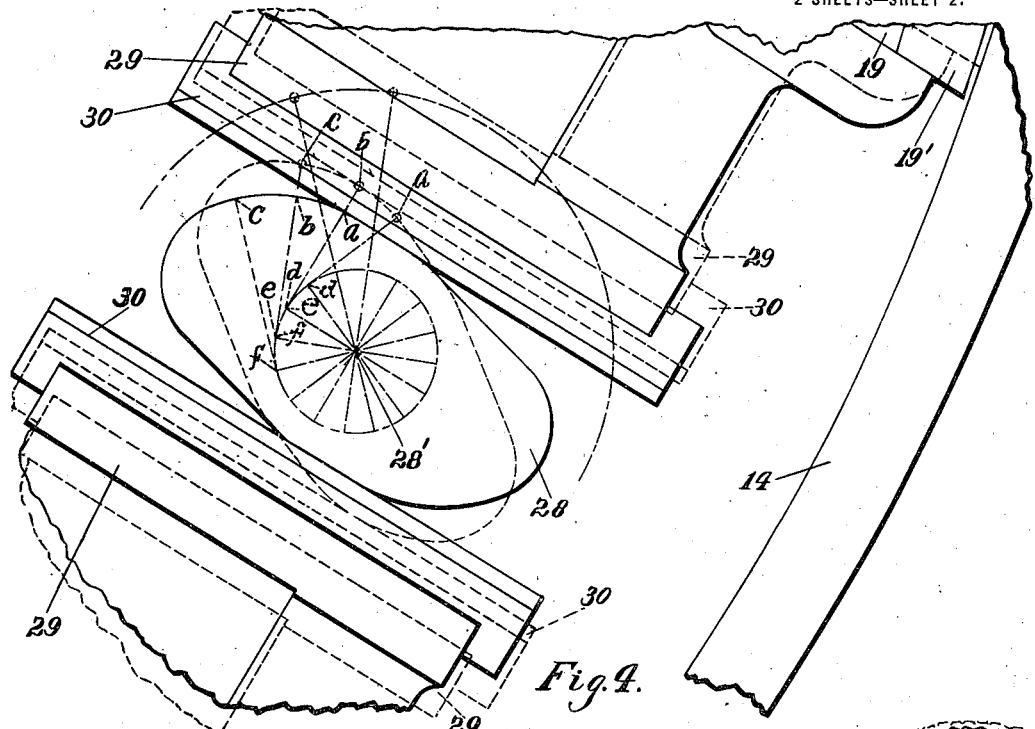
Fig. 4 is a diagrammatic enlarged view showing the contiguous ends of the brake shoes and the expanding cam.

Referring to the drawings, 10 represents one of the side members of the vehicle frame which is supported upon the springs 11 from the axle 12. One of the wheels 13 of the vehicle is shown and the brake drum of the other wheel is shown in section at 14. 15 is the radius or distance rod extending from the axle to the frame.

The stationary part of the axle 12 is in the form of a tube as shown in Fig. 2 and within this tube are the axle sections 16 which are suitably connected to drive the wheels 13, which are shown as mounted in bearings 17 on the outside of the tubular axle 12. (See Fig. 2).

Secured to, or formed as a part of the axle 12 is a brake supporting member having arms 18 and 18' shown in Figs. 1 and 2. These arms are radially disposed and extend in opposite directions within the brake drum 14. The arm 18 supports the brake shoe or brake band 19 by means more fully hereinafter described. The arm 18 has adjacent the outer end a boss $18^2$ in which a transverse member or pin 20 is suitably fitted. This transverse member is secured at a point between its ends to the boss $18^2$ and extends on either side of its supporting arm. It will also be seen that the member 20 is secured against movement by means of a clamping bolt $20^a$ and has wearing pieces or blocks 21 suitably arranged on the end portions thereof. Secured to the brake shoe 19 or formed integral therewith are lugs 22 which are adapted to be slidingly mounted on the blocks or wearing pieces 21. This method of mounting permits the central part of the brake shoe to slide radially of the axle toward and from the brake drum 14, and springs 23 retain the brake shoe yieldingly out of contact with the brake drum. The brake shoe is provided with a brake lining 19' and an adjustable set screw 24 determines the extent to which the brake shoe may be permitted to be retracted from the drum.

The opposite arm 18' has a bearing 25 for a rock shaft 26 upon one end of which is an operating arm 27 and upon the other end of which is a cam 28 which is positioned between the opposing ends 29 of the brake shoe 19. These ends 29 are arranged adjacent each other and are adapted to be expanded by means of the cam 28 so that the brake shoe will be pressed into contact with the brake drum 14, which will be clearly understood from the drawing. The ends 29 are provided with suitable wearing pieces 30, and a spring 31 is connected to the ends for holding them yieldingly in contact with the cam 28 and therefore out of contact with the brake-drum 14. The arm 27 which operates the rock shaft 26 is itself operated through a connecting rod 32 which is adjustably connected as at 33 to a brake operating lever 34 pivoted at 35 to the frame 10 of the vehicle. It will be understood that the connecting rod 32 is considerably shortened in the drawing, due to the contracted space, but the operation of the part is the same as if the brake lever 34 were placed forwardly on the frame in its usual position. A stop 36 is secured on the frame as shown to limit the rearward movement of the lower arm of the brake operating lever 34. Thus all of the connections between the brake and the operating lever 34 are held in tension by the spring 31.

Figure 5:
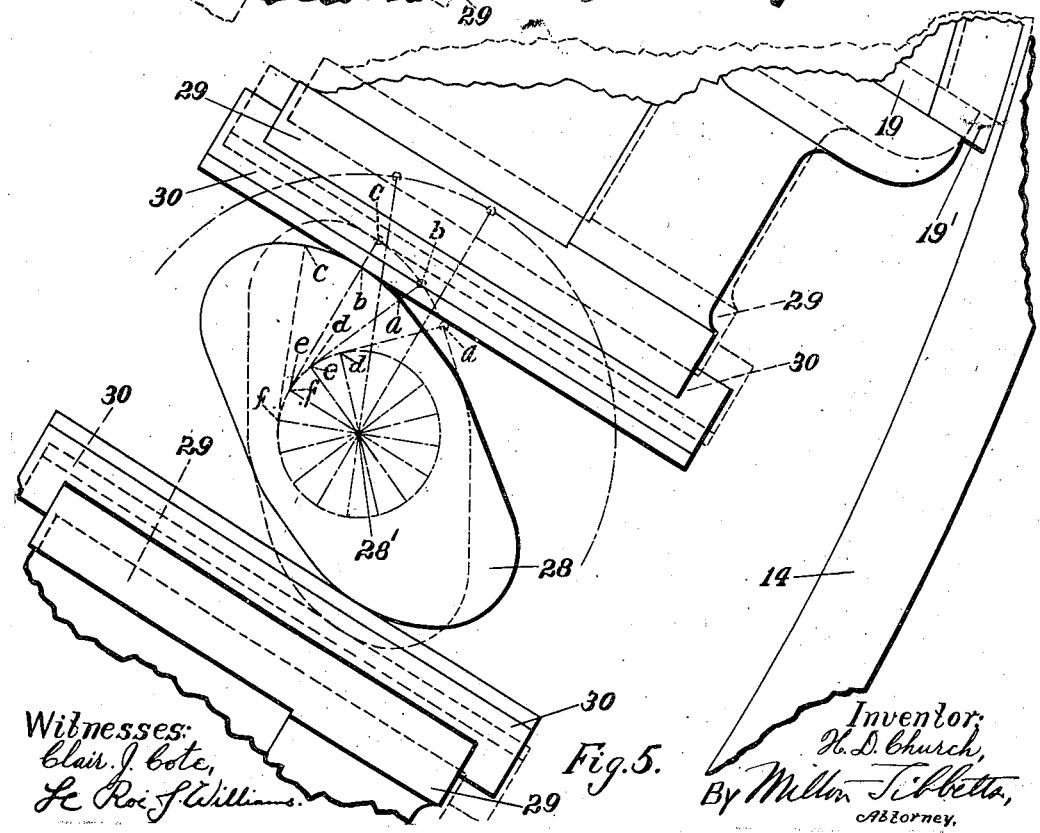
Fig. 5 is a view similar to Fig. 4 but with the parts in a different position.

The shape or form of the cam 28 is clearly illustrated in Figs. 3, 4 and 5, and it may be described as a uniform motion cam. In other words, the surface of the cam is of special spiral form instead of flat or rectangular as heretofore. For instance, in Fig. 3, $a$, $b$ and $c$, represent three separate points of contact of the cam with the wearing pieces 30 of the end 29 of the brake shoe. $d$, $e$, and $f$ represent three points $22\frac{1}{2}°$ apart on a circle drawn about the axis 28' of the cam. The cam is so formed that the line $c$—$f$ is exactly as much longer than the line $b$—$e$ as the latter is longer than the line $a$—$d$. Thus when the cam is rotated $22\frac{1}{2}°$ or the distance from $d$ to $e$ the shoe has been moved a certain distance, and if the cam is rotated another $22\frac{1}{2}°$ or the distance from $e$ to $f$ the shoe is moved the same distance as when the cam was rotated from $d$ to $e$. Thus, if it takes the first said movement of $22\frac{1}{2}°$ of the cam with the rock shaft 26 to set the brakes from their normal inoperative position when the brake lining is new, it will take the same movement only of the rock shaft 26 to fully apply the brakes after the brake lining has worn considerably and the adjustment taken up through the device 33. Thus it will be seen that the cam 28 has the same leverage under one of the above referred to conditions as under the other.

The operation of the cam upon the ends of the brake shoe is particularly well illustrated in Figs. 4 and 5. In Fig. 4 the full lines represent the brake in inoperative position and with a new lining 19'. In dotted lines the cam has been turned sufficiently to fully apply the brake shoes to the brake band and it will be seen that the cam has been rocked approximately $\frac{1}{16}$ of a full circle or $22\frac{1}{2}$ degrees. In Fig. 5 the full lines show the brake shoe in its normal inoperative position and with the lining 19' considerably worn. In this case the cam has been adjusted so that in its inoperative position it is in exactly the same position as is shown in dotted lines in Fig. 4. If then, the cam is rocked through the same number of degrees as in Fig. 4, that is, $\frac{1}{16}$ of a full circle or $22\frac{1}{2}°$, the brake shoe ends are separated the same distance as they were in Fig. 4 and the brake is fully applied. Of course, the same thing will be true when the brake lining is worn further and the cam is adjusted to take up for this wear.

Under all conditions of the brake lining therefore, until it is fully worn out, the leverage of the cam over the brake shoes is the same.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:—

1. A brake mechanism comprising a brake drum, a brake, and a uniform motion cam for operating said brake.

2. A brake mechanism comprising a brake drum, an expanding brake coöperating with said drum, and a uniform motion cam for operating said brake.

3. A brake mechanism comprising a brake drum, an expanding brake coöperating with said drum, and a double faced uniform motion cam for operating said brake.

4. A brake mechanism comprising a brake drum, a shoe adapted to coöperate with said drum, a plate cam for operating the shoe, and a lever for operating the cam, the cam being formed so as to cause a movement of the brake shoe to a certain extent upon the movement of the lever through a certain number of degrees and to cause a further movement of the brake shoe to an equal extent upon the further movement of the lever through the same number of degrees.

5. In a motor vehicle the combination with a brake drum and the brake shoe coöperating therewith, of a plate cam for operating the brake shoe, a lever for operating the cam, and an adjustable connection between the lever and the cam, said cam being formed so as to cause a uniform motion of the shoe within the limits of movement of the cam.

6. A brake mechanism comprising, in combination with an axle, a supporting member mounted on said axle and having a radially extending arm, a transverse member secured between its ends to said arm, a brake shoe mounted on said transverse member whereby said shoe may be moved radially of said arm, spring means for so moving said shoe in one direction and adjustable means for limiting said movement.

7. A brake mechanism comprising, in combination with an axle, a supporting member mounted on said axle and having a radially extending arm, a transverse member secured between its ends to said arm, and a brake shoe mounted on said transverse member whereby said shoe may be moved radially of said arm, and adjustable means for limiting said movement.

8. A brake mechanism comprising, in combination with an axle, a supporting member arranged on said axle and having a radially extending arm, said arm having a boss formed thereon adjacent the end thereof, a pin secured in said boss, and a brake shoe mounted on the opposite ends of said pin.

9. A brake mechanism comprising, in combination with an axle, a supporting member arranged on said axle, and having a radially extending arm, said arm having a boss formed adjacent the end thereof, a pin secured in said boss, and a brake shoe mounted on the opposite ends of said pin, and adapted for movement radially of said arm.

10. A brake mechanism comprising, in combination with an axle, a brake drum mounted to rotate thereon, a supporting member mounted on said axle and having a radially extending arm, a transverse member secured between its ends to said arm, wearing pieces arranged on the ends of said transverse member, and a brake shoe mounted on said wearing pieces, and adapted for movement against said drum.

11. A brake mechanism comprising, in combination with an axle, a brake drum mounted to rotate thereon, a supporting member mounted on said axle and having a radially extending arm, a transverse member secured between its ends to said arm, wearing pieces arranged on the ends of said transverse member, a brake shoe mounted on said wearing pieces and adapted for movement radially of said axle, and adjustable means for limiting said radial movement.

In testimony whereof I affix my signature in the presence of two witnesses.

HAROLD D. CHURCH.

Witnesses:
I. M. WAGNER,
LE ROY J. WILLIAMS.